(12) United States Patent
Cho

(10) Patent No.: US 12,643,550 B2
(45) Date of Patent: Jun. 2, 2026

(54) APPARATUS AND METHOD FOR DETERMINING ROAD ENVIRONMENT

(71) Applicant: HL Klemove Corp., Incheon (KR)

(72) Inventor: Han Shin Cho, Yongin-si (KR)

(73) Assignee: HL Klemove Corp., Incheon (KR)

( * ) Notice: Subject to any disclaimer, the term of this patent is extended or adjusted under 35 U.S.C. 154(b) by 13 days.

(21) Appl. No.: 18/742,197

(22) Filed: Jun. 13, 2024

(65) Prior Publication Data

US 2025/0115247 A1      Apr. 10, 2025

(30) Foreign Application Priority Data

Oct. 10, 2023      (KR) ........................ 10-2023-0134223

(51) Int. Cl.
*B60W 40/06*      (2012.01)
*G06V 20/56*      (2022.01)

(52) U.S. Cl.
CPC ........... *B60W 40/06* (2013.01); *G06V 20/588* (2022.01); *B60W 2420/403* (2013.01); *B60W 2552/20* (2020.02)

(58) Field of Classification Search
CPC ........... B60W 40/06; B60W 2420/403; B60W 2552/20; B60W 2552/30; B60W 2552/53; B60W 30/12; B60W 40/072; B60W 60/0053; G06V 20/588
See application file for complete search history.

(56) References Cited

U.S. PATENT DOCUMENTS

| | | | | |
|---|---|---|---|---|
| 8,447,484 B2* | 5/2013 | Saito | ..................... | B60W 30/12 |
| | | | | 382/184 |
| 9,120,486 B1* | 9/2015 | Mallinger | ............. | B60W 30/12 |
| 9,321,461 B1* | 4/2016 | Silver | ............... | B60W 60/0016 |
| 10,406,981 B2* | 9/2019 | Chundrlik, Jr. | ......... | G01S 19/39 |
| 10,717,448 B1* | 7/2020 | Seo | .......................... | H04W 4/44 |
| 11,453,393 B2* | 9/2022 | Wienecke | ............. | B60W 10/20 |
| 2009/0157286 A1* | 6/2009 | Saito | ..................... | B60W 30/12 |
| | | | | 701/300 |
| 2011/0235861 A1* | 9/2011 | Nitanda | ............... | G06V 20/588 |
| | | | | 382/103 |
| 2013/0136306 A1* | 5/2013 | Li | ........................ | G06V 10/145 |
| | | | | 382/103 |
| 2013/0272577 A1* | 10/2013 | Sakamoto | .............. | G06V 10/48 |
| | | | | 382/103 |
| 2016/0012298 A1* | 1/2016 | Maeda | ..................... | G06T 7/60 |
| | | | | 382/104 |
| 2016/0327947 A1* | 11/2016 | Ishikawa | ............... | B60W 50/14 |
| 2018/0373941 A1* | 12/2018 | Kwant | ................. | G08G 1/0145 |
| 2019/0205665 A1* | 7/2019 | Duan | ................... | G06V 20/588 |
| 2019/0241187 A1* | 8/2019 | Maus | ............. | B60W 30/18163 |
| 2021/0248391 A1* | 8/2021 | Kizumi | ............. | G01C 21/3863 |

(Continued)

*Primary Examiner* — Kurt Philip Liethen
(74) *Attorney, Agent, or Firm* — Hauptman Ham, LLP

(57)      ABSTRACT

An apparatus and method for determining road environment is provide, and the apparatus for determining road environment according to an embodiment of the present disclosure comprises: a data collector configured to obtain data on road environment information and data on vehicle behavior; a data processor configured to determine reliability of the obtained data; a data determiner configured to determine the road environment based on the reliability; and a vehicle controller configured to control a vehicle based on the determined road environment.

18 Claims, 6 Drawing Sheets

(56) References Cited

U.S. PATENT DOCUMENTS

| | | | |
|---|---|---|---|
| 2022/0262137 A1* | 8/2022 | Park | B62D 15/029 |
| 2023/0152807 A1* | 5/2023 | Song | G05D 1/81 |
| | | | 701/23 |

* cited by examiner

APPARATUS AND METHOD FOR DETERMINING ROAD ENVIRONMENT

CROSS-REFERENCE TO RELATED APPLICATION

This application claims the benefit of and priority to Korean Patent Application No. 10-2023-0134223 filed on Oct. 10, 2023, the entire disclosures of which are incorporated herein by reference.

TECHNICAL FIELD

The present disclosure relates to an apparatus and method for determining road environment, and more specifically, to an apparatus and method for determining road environment including a ramp section using camera and vehicle sensor information in a limited sensor configuration.

BACKGROUND

The advanced driver assistance system (ADAS) in recent vehicles goes beyond the basic function of simply assisting the driver in operating the braking device, the steering wheel, and the accelerator pedal, and is developing into a technology to drive the vehicle by automatically determining the optimal driving path by actively collecting information about the surrounding environment and other vehicles.

These ADAS are core technologies for implementing smart cars, and includes the highway driving assistance system (HDA, a technology that automatically maintains the distance between vehicles), the rear side blind spot warning system (BSD, a technology that detects surrounding vehicles and sounds an alarm while reversing), the Automatic Emergency Braking System (AEB, a technology that activates the brake when it does not recognize the vehicle in front), the Lane Departure Warning System (LDWS), the Lane Keeping Assist System (LKAS, a technology that prevent from departing the lane without a turn signal), the Lane Following System (LFS, a technology that guides driving along the center of the lane), the Advanced Smart Cruise Control (ASCC, a technology that maintains the distance between vehicles at a set speed), the Driving Assistance System in Congested Areas (TJA), the Parking Collision Prevention Assist, the Parking Collision-Avoidance Assist (PCA) and the adaptive cruise control (ACC), and so on.

However, what plays the most important role in this ADAS function is the camera for measuring the distance between the lane line and the vehicle, and the control performance of this ADAS function greatly depends on the reliability of the lane information obtained by the camera.

In addition, there is a possibility of lane misrecognition in various situations such as shadows, road cracks, road junctions, toll gates, and tunnels. Since such lane misrecognition directly leads to system malfunction, research for increasing the reliability and robustness of the system is required.

In particular, when operating the ADAS function, it is necessary to accurately determine a ramp section where lanes diverge on such as highways, and to perform an appropriate control accordingly. However, there is a problem that it is not easy to determine the road environment for the ramp section in the camera only system, which may cause system malfunction.

SUMMARY

The problem to be solved by the present disclosure is to provide an apparatus and method that can determine the ramp section in limited sensor configuration environment which includes only a camera.

Another problem to be solved by the present disclosure is to provide an apparatus and method that can determine the ramp section with high reliability by varying parameters according to the driving environment and sensor performance.

Another problem to be solved by the present disclosure is to provide an apparatus and method that can determine the ramp section with greater reliability in a system combined with a navigation, a lidar, a radar, etc.

The problems of the present disclosure are not limited to the problems mentioned above, and other problems not mentioned will be clearly understood by those skilled in the art from the description below.

In order to solve the problems described above, an apparatus for determining road environment according to an embodiment of the present disclosure comprises: a data collector configured to obtain data on road environment information and data on vehicle behavior; a data processor configured to determine reliability of the obtained data; a data determiner configured to determine the road environment based on the reliability; and a vehicle controller configured to control a vehicle based on the determined road environment.

Further, the data on road environment information may comprise driving lane information, adjacent lane information, and road boundary information.

Further, the data processor may be configured to determine the reliability of the data based on a viewing range, a curvature, or a recognition clarity of the data.

Further, the data determiner may be configured to: set a reference lane line based on the determined reliability; determine whether a road boundary exists outside the set reference lane line; and in response to a determination that the road boundary exists, determine that a ramp section exists in front of the vehicle if an absolute value of a difference between a curvature of the reference lane line and a curvature of the road boundary is greater than a threshold value.

Further, the vehicle controller may be configured to transfer a steering control authority of the vehicle to a driver in response to the determination that the ramp section exists in front of the vehicle.

Further, the data processor may be configured to assign a higher reliability score to a lane line in a direction opposite to a turning direction of the vehicle than a lane line in the turning direction.

Further, the data collector may be configured to obtain data from images captured by a camera.

In order to solve the problems described above, a method for determining road environment according to an embodiment of the present disclosure comprises: obtaining data on road environment information and data on vehicle behavior; determining reliability of the obtained data; determining the road environment based on the reliability; and controlling a vehicle based on the determined road environment.

Further, the data on road environment information may comprise driving lane information, adjacent lane information, and road boundary information.

Further, the determining of the reliability of the obtained data may comprise determining the reliability of the data based on a viewing range, a curvature, or a recognition clarity of the data.

Further, the determining of the road environment based on the reliability may comprise: setting a reference lane line based on the determined reliability; determining whether a road boundary exists outside the set reference lane line; and in response to a determination that the road boundary exists, determining that a ramp section exists in front of the vehicle if an absolute value of a difference between a curvature of the reference lane line and a curvature of the road boundary is greater than a threshold value.

The method may further comprise: transferring a steering control authority of the vehicle to a driver in response to the determination that the ramp section exists in front of the vehicle.

Further, the determining of the reliability of the obtained data may comprise assigning a higher reliability score to a lane line in a direction opposite to a turning direction of the vehicle than a lane line in the turning direction.

In order to solve the problems described above, an apparatus for determining road environment according to an embodiment of the present disclosure comprises at least one processor and a memory, wherein by executing program instructions loaded into the memory, the at least one processor is configured to: obtain data on road environment information and data on vehicle behavior; determine reliability of the obtained data; determine road environment based on the reliability; and control a vehicle based on the determined road environment.

According to embodiments of the present disclosure, malfunction of the vehicle can be prevented by accurately determining the ramp section even in limited sensor configuration environment.

Further, according to embodiments of the present disclosure, ADAS functions such as LFA, HAD, LKA, etc. can be used even in sensor configuration environment where there are no external sensors other than a camera.

In addition, according to embodiments of the present disclosure, the ramp section can be determined more accurately not only in the camera only system but also in the camera system combined by additional sensor configurations such as a navigation, a lidar, and a radar.

The various and beneficial advantages and effects of the present disclosure are not limited to the effects described above, and further various effects may be included in the present disclosure.

DETAILED DESCRIPTION

Hereinafter, embodiments of the present disclosure will be described in detail with reference to the accompanying drawings. Below, if it is determined that there is a risk of unnecessarily obscuring the gist of the present disclosure, detailed descriptions of already known functions and configurations will be omitted. In addition, it should be noted that the contents described below only relates to one embodiment of the present disclosure and is not limited thereto.

The terms used in this disclosure are only used to describe specific embodiments and are not intended to limit the disclosure. For example, a component expressed in the singular number should be understood as a concept that includes plural components unless the context clearly indicates only the singular number. It should be understood that the term "and/or" as used in this disclosure encompasses any and all possible combinations of one or more of the listed items. Terms such as 'include' or 'have' used in the present disclosure are only intended to designate the presence of features, numbers, steps, operations, components, parts, or combinations thereof described in the present disclosure, and the use of these terms is not intended to exclude the presence or addition of one or more other features, numbers, steps, operations, components, parts or combinations thereof.

In the embodiments of the present disclosure, 'module' or 'unit' refers to a functional part that performs at least one function or operation, and may be implemented as hardware or software, or as a combination of hardware and software. Additionally, a plurality of 'modules' or 'units' may be integrated into at least one software module and implemented by at least one processor, except for 'modules' or 'units' that need to be implemented with specific hardware.

In addition, unless otherwise defined, all terms used in this disclosure, including technical or scientific terms, have the same meaning as commonly understood by a person of ordinary skill in the technical field to which this disclosure pertains. It should be noted that terms defined in commonly used dictionaries should be interpreted as having a meaning consistent with the context meaning of the related technology, and should not be interpreted in an overly restrictive or expanded manner unless clearly defined otherwise in the present disclosure.

Hereinafter, an apparatus and method for determining a ramp section according to the present disclosure will be described in detail with reference to the drawings.

Figure 1:
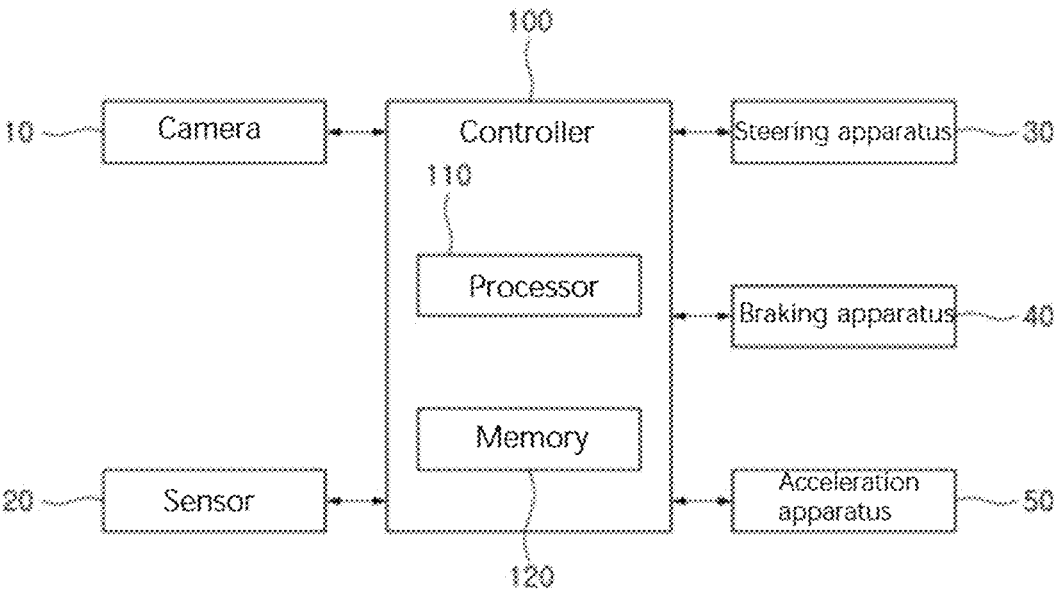
FIG. 1 is a diagram illustrating a configuration of a vehicle in which an apparatus and a method for determining road environment according to an embodiment of the present disclosure are implemented.

FIG. 1 is a diagram illustrating a configuration of a vehicle in which an apparatus and a method for determining road environment according to an embodiment of the present disclosure are implemented.

Referring to FIG. 1, the vehicle may include a camera 10, a sensor 20, a steering apparatus 30, a braking apparatus 40, an acceleration apparatus 50, a controller 100, etc.

In FIG. 1, the vehicle is shown as having a limited sensor configuration including only a camera 10 and a sensor (vehicle sensor) 20, but the present disclosure is not limited to this, and may also be implemented in a vehicle including additional components such as a radar, a lidar, a communication unit, and a navigation.

The controller 100 may perform overall control of the vehicle and may be communicatively connected to the camera 10 and the sensor 20.

Additionally, the controller 100 may be communicatively connected to the steering apparatus 30, the braking apparatus 40, and the acceleration apparatus 50 to control the driving of the vehicle according to a process defined by ADAS. Additionally, the controller 100 may be electrically connected to other electronic devices in the vehicle.

The camera 10 may include a controller (Electronic Control Unit, ECU). The controller 100 may be implemented as an integrated controller including a controller of the camera 10 and a controller of the sensor 20.

The camera 10 may photograph the front of the vehicle and identify other vehicles, pedestrians, cyclists, lanes, road signs, etc. Additionally, the camera 10 may identify road structures such as median strips and guard rails.

The camera 10 may include a plurality of lenses and image sensors. The image sensor may include a plurality of photo diodes that convert the light into the electrical signal, and the plurality of photo diodes may be arranged in a two-dimensional matrix.

The camera 10 may be electrically connected to the controller 100. For example, the camera 10 may be connected to the controller 100 through a vehicle communication network (NT), or connected to the controller 100 through a hard wire, or a printed circuit board (PCB).

The camera 10 may transmit image data of the front of the vehicle to the controller 100.

The sensor 20 may obtain data on vehicle behavior. For example, the sensor 20 may include a speed sensor that detects the speed of the wheel, an acceleration sensor that detects the lateral and longitudinal acceleration of the vehicle, a yaw rate sensor that detects a change in the angular velocity of the vehicle, and a gyro sensor that detects the inclination of the vehicle, a steering angle sensor that detects the rotation and steering angle of the steering wheel, and/or a torque sensor that detects the steering torque of the steering wheel. The data on vehicle behavior may include a vehicle speed, a longitudinal acceleration, a lateral acceleration, a steering angle, a steering torque, a driving direction, a yaw rate, and/or an inclination.

The steering apparatus 30 may receive a target steering angle required for driving the vehicle under the control of the controller 100 and generate a torque so that the wheels can be steered by following the target steering angle. In one embodiment of the present disclosure, the steering apparatus 30 may be an Electric Power Steering (EPS) system.

The braking apparatus 40 may control the brake hydraulic pressure supplied to the wheel cylinder under the control of the controller 100, thereby braking the wheels of the vehicle to decelerate the vehicle.

The acceleration apparatus 50 may control the driving force of the engine by controlling the engine torque or the rotational speed (RPM) of the electric motor under the control of the controller 100.

The controller 100 may include a processor 110 and a memory 120.

The controller 100 may include one or more processor 110. The at least one processor 110 included in the controller 100 may be integrated into one chip or may be physically separated. Additionally, the processor 110 and memory 120 may be implemented as a single chip.

The processor 110 may process image data from the camera 10. Additionally, the processor 110 may generate a steering signal for controlling the steering apparatus 30, a braking signal for controlling the braking device 40, and an acceleration signal for controlling the acceleration apparatus 50.

For example, the processor 110 may include an image signal processor that processes image data from the camera 10, and a micro control unit (MCU) that generates steering signals, braking signals, and acceleration signals.

The memory 120 may store programs and/or data for the processor 110 to process image data. Additionally, the memory 120 may store programs and/or data for the processor 110 to generate control signals related to the configuration of the vehicle.

The memory 120 may temporarily store image data received from the camera 10. Additionally, the memory 120 may temporarily store the results of processing image data and/or radar data by the processor 110. The memory 120 may include not only volatile memories such as S-RAM and D-RAM, but also non-volatile memories such as flash memory, Read Only Memory (ROM), and Erasable Programmable Read Only Memory (EPROM).

Figure 2:
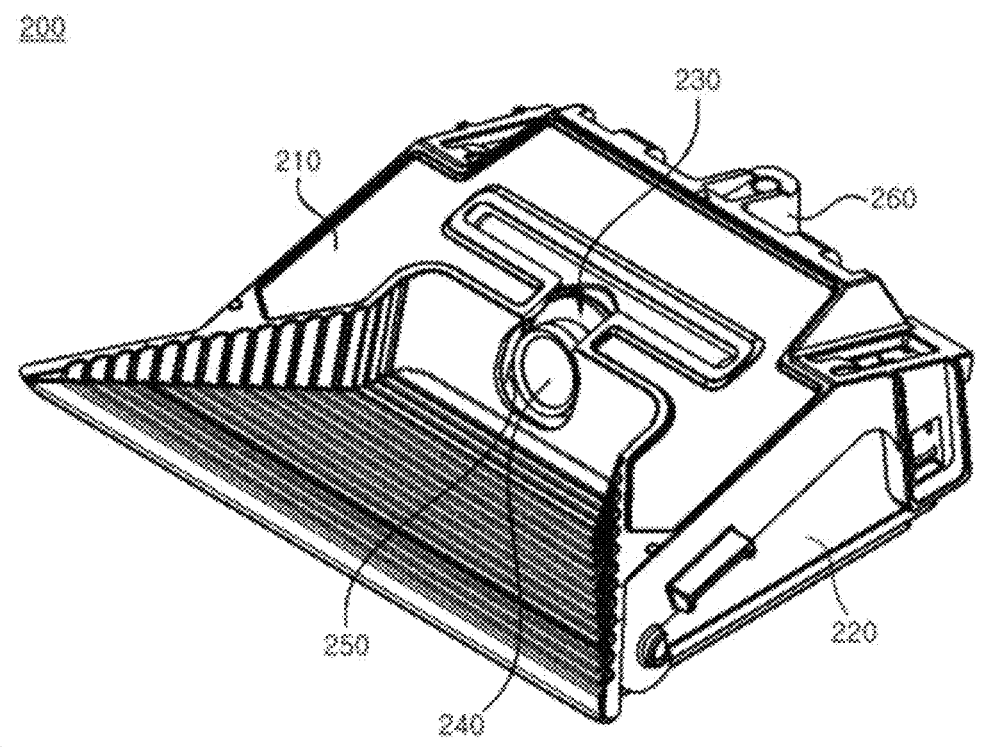
FIG. 2 is a perspective view showing a configuration of a camera according to an embodiment of the present disclosure.

FIG. 2 is a perspective view showing a configuration of a camera according to an embodiment of the present disclosure.

Referring to FIG. 2, the camera 200 may include a bracket 210, a housing 220, a barrel unit 230, a lens unit 240, a lens hole 250, a fastening unit 260, etc.

The bracket 210 may be coupled to the inner surface of the windshield glass of the vehicle, and the upper surface of the bracket 210 may be attached to the inner surface of the front windshield glass disposed at the front of the vehicle or to the inner surface of the rear windshield glass disposed at the rear of the vehicle.

Further, the bracket 210 may be provided to support the top, front, rear, and both sides of the housing 220. As shown in FIG. 2, the bracket 210 may be provided to cover a certain section of both side portions and the upper portion of the housing 220. In this regard, a lens hole 250 may be formed by penetrating from front to back at the front of the bracket 210 covering the upper portion of the housing 220. The lens hole 250 may be formed so that the lens unit 240 provided at the housing 220 is exposed through the lens hole 250 when the bracket 210 and the housing 220 are coupled.

The fastening unit 260 may be combined with an angle adjustment means (not shown) that allows adjusting the photographing angle of the camera 200.

In FIG. 2, the configuration of the camera 200 is briefly shown only for the parts necessary for explaining the present disclosure, but the present disclosure is not limited thereto, and the camera 200 may further include additional configurations not shown.

Figure 3:
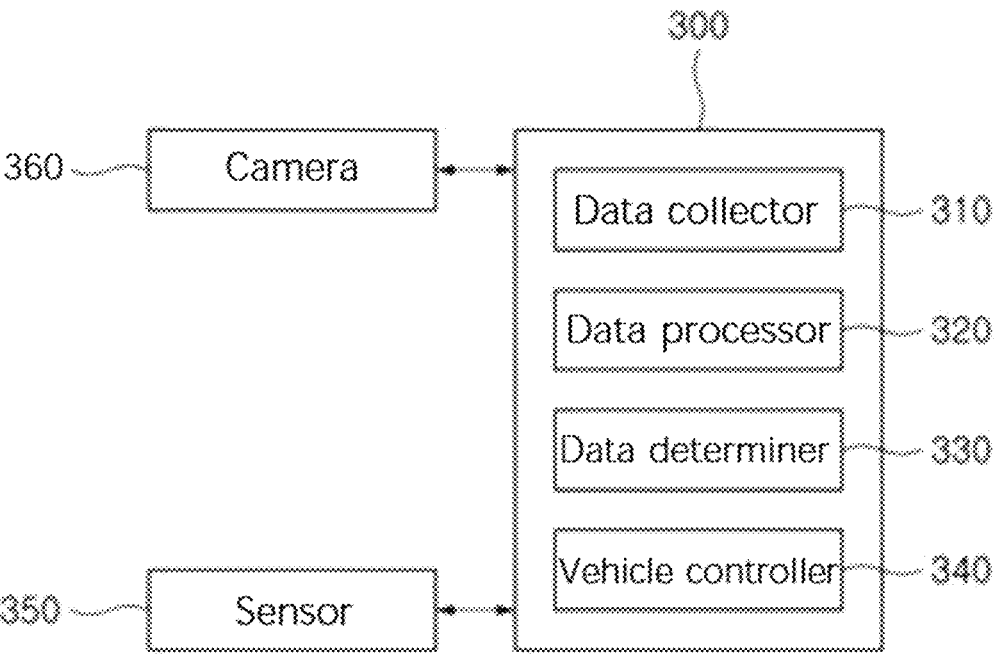
FIG. 3 is a block diagram illustrating each detailed function of an apparatus for determining road environment according to an embodiment of the present disclosure.

FIG. 3 is a block diagram illustrating each detailed function of an apparatus for determining road environment 300 according to an embodiment of the present disclosure.

The apparatus for determining road environment 300 may include the controller 100 shown in FIG. 1 and electronic components connected thereto, but the present disclosure is not limited thereto and may further include an additional processor, memory, and other electronic components.

The apparatus for determining road environment 300 may be communicatively connected to the camera 360 and the sensor 350. The camera 360 and sensor 350 of FIG. 3 may have the same configuration as the camera 10 and sensor 20 of the vehicle shown in FIG. 1, respectively, but the present disclosure is not limited thereto and may also be configured by separate devices provided for the apparatus for determining road environment 300.

As shown in FIG. 3, the apparatus for determining road environment 300 may include a data collector 310, a data processor 320, a data determiner 330, and a vehicle controller 340.

The data collector 310 may obtain data on at least one road environment information among driving lane information, adjacent lane information, and road boundary information based on image information captured by the camera 340.

Driving lane information may include at least one of the position, the heading angle, the curvature, the view angle, or the quality of the driving lane. Adjacent lane information may include the validity or the position of the adjacent lane. Road boundary information may include at least one of the type, the validity, or the position of the road boundary.

In addition, the data collector 310 may obtain the data on vehicle behavior from the sensor 350, the data including at least one of the vehicle speed, the longitudinal acceleration, the lateral acceleration, the steering angle, the steering torque, the driving direction, the yaw rate, and/or the inclination.

The data processor 320 may determine the reliability of each data obtained by the data collector 310. In an embodiment of the present disclosure, the data processor 320 may calculate a reliability score for each data acquired by the data collector 310 and determine the reliability of each data based on the reliability score. Further, the data processor 320 may determine the turning direction (heading direction) of the vehicle according to the vehicle behavior data obtained by the data collector 310. In addition, the data processor 320 may determine the reliability of the identified lane, the position of the vehicle, presence or absence of road boundaries in adjacent lanes, viewing range of the lane, etc., based on at least one road environment information of at least one of driving lane information, adjacent lane information, or road boundary information acquired by the data collector 310.

The data determiner 330 may determine the road environment based on the data obtained by the data collector 310 and the data processor 320 and the reliability of each obtained data. In one embodiment of the present disclosure, the data determiner 330 may determine whether a ramp section, a toll gate, or an intersection exists in the driving direction of the vehicle. Specifically, the data determiner 330 may recognize the lane line in the direction opposite to the turning direction of the vehicle on the recognized driving lane as a reliable reference lane line. Afterwards, it may be determined whether a road boundary exists outside the recognized reference lane line. If it is determined that the road boundary exists, the absolute value of the difference between the curvature of the recognized reference lane line and the curvature of the road boundary may be compared with a predetermined threshold value, and it may be determined that a ramp section exists or not in the driving direction of the vehicle based on the comparison result. For example, the data determiner 330 may determine that a ramp section exists in front of the vehicle in the driving direction if the absolute value of the difference between the curvature of the recognized reference lane line and the curvature of the road boundary is greater than the threshold value. A specific embodiment in which the data determiner 330 determines whether the ramp section exists in the driving direction of the vehicle will be described in more detail with reference to FIG. 4.

The vehicle controller 340 may control the operation of the vehicle according to a predetermined method based on the road environment determined by the data determiner 330. In one embodiment of the present disclosure, when the steering of the vehicle is automatically controlled by the controller according to an ADAS function such as HAD, the data determiner 330 may determine that there is a ramp section in front of the vehicle in the driving direction. In this case, the vehicle controller 340 may control the steering control authority of the driving vehicle to be transferred to the driver. In another embodiment of the present disclosure, if it is determined that there is a ramp section in front of the vehicle in the driving direction, and it is determined that the driver wants to drive in the ramp section based on the vehicle behavior obtained by the vehicle sensor, the vehicle controller 340 may control the vehicle to perform a predetermined ramp section entry operation so that the vehicle can smoothly enter the ramp section.

In FIG. 3, the apparatus for determining road environment 300 is illustrated to be operated based only on data obtained by the camera 360 and the sensor 350, but the present disclosure is not limited thereto, and the apparatus for determining road environment 300 may obtain additional data from devices including a lidar, a navigation, a V2X modules, etc. and may operate in conjunction with the additional data.

Figure 4:
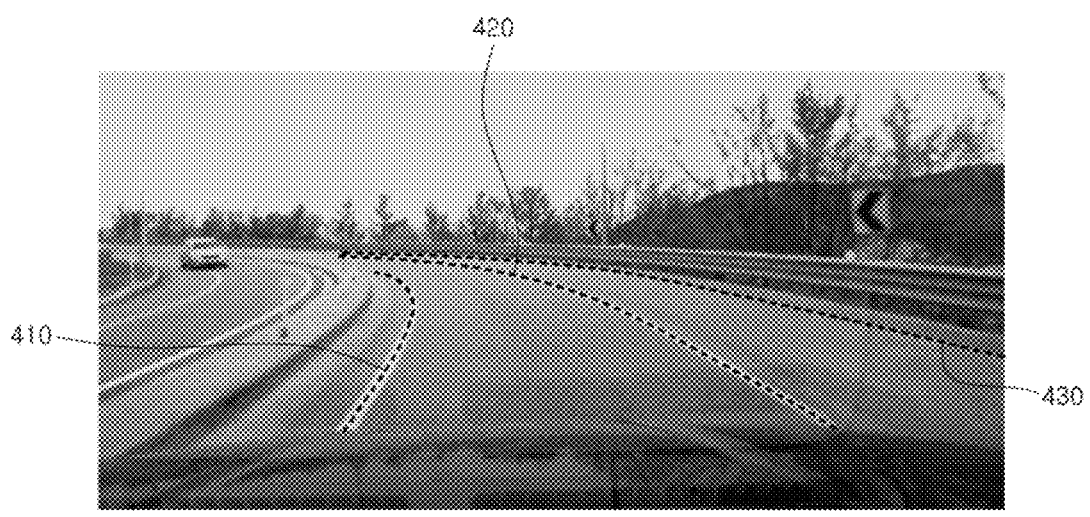
FIG. 4 is a diagram explaining an exemplary method for determining whether a ramp section exists in a driving direction of the vehicle.

FIG. 4 is a diagram explaining an exemplary method for determining whether a ramp section exists in a driving direction of the vehicle. The method is assumed to be performed by the apparatus for determining road environment shown in FIG. 3, and the same reference numerals are used for the same components.

Referring to FIG. 4, the data collector 310 may collect data regarding the lane lines 410, 420 and the road boundary 430 in the driving direction through the image captured by the camera 360. The data processor 320 may determine the reliability of the collected data regarding the lane lines 410, 420 and the road boundary 430. For example, the data processor 320 may determine the turning direction (heading direction) of the vehicle and then, based on this, identify the lane line 410 in the turning direction and the lane line 420 in the direction opposite to the turning direction. In addition, the reliability score for each of the lane line 410 in the turning direction and the lane line 420 in the opposite direction to the turning direction may be calculated based on the viewing range, the curvature, the recognition clarity, etc. At this time, the data processor 320 may assign a higher reliability score to the lane line 420 than the lane line 410 based on the fact that the lane line 420 in the opposite direction to the turning direction has a longer viewing range, a smaller curvature, and a higher recognition clarity than the lane 410 in the turning direction. Afterwards, the data determiner 330 may set the lane line 420 in the opposite direction to the turning direction, which has a higher reliability score from the recognized lane lines 410 and 420, as the reference lane line. Next, the data determiner 330 may determine whether a road boundary 430 exists outside the reference lane line 420. At this time, if it is determined that the road boundary 430 exists, the road environment may be determined by comparing the similarity between the reference lane line and the road boundary 430. In one embodiment of the present disclosure, the absolute value of the difference between the curvature value of the reference lane line 420 and the curvature of the road boundary 430 may be compared with a predetermined threshold value, and if the absolute value of the difference is greater than the threshold value, the data determiner 330 may determine that there is a ramp section in the front of the vehicle in the driving direction.

Figure 5:
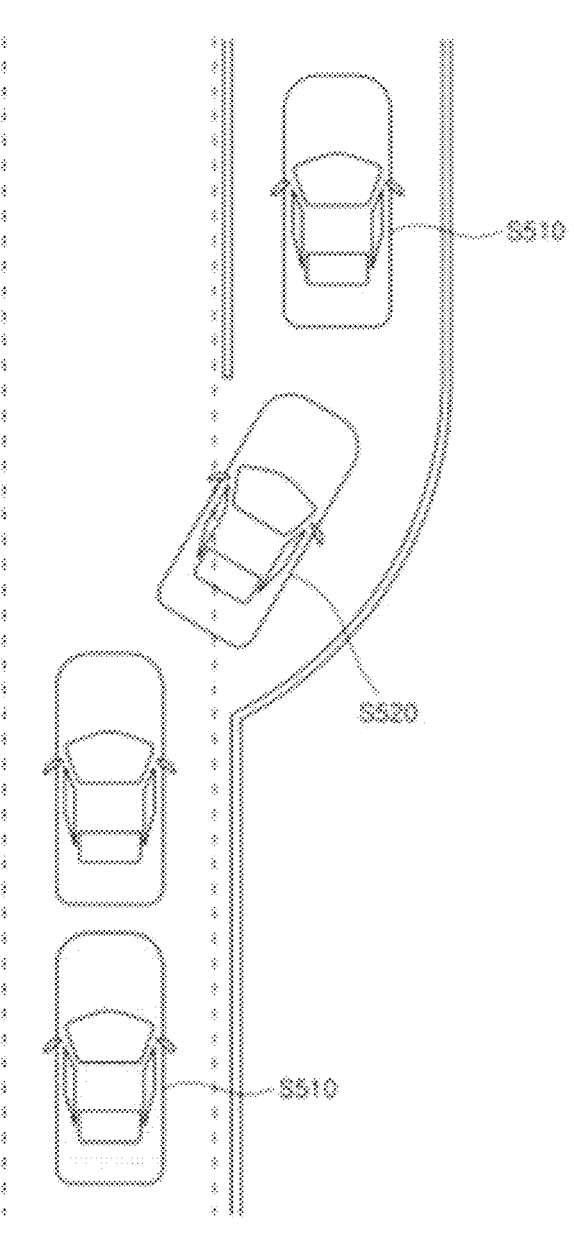
FIG. 5 is a diagram illustrating an embodiment of controlling a vehicle if the apparatus for determining road environment determines that there is a ramp section in front of the vehicle.

FIG. 5 is a diagram illustrating an embodiment of controlling a vehicle if the apparatus for determining road environment determines that there is a ramp section in front of the vehicle.

Referring to FIG. 5, the apparatus for determining road environment may determine that the ramp section exists in front of the vehicle based on data collected and processed from images captured by the camera (S510). At this time, if the apparatus for determining road environment determines that the vehicle's steering operation is automatically controlled by an ADAS function such as HAD, it may be determined to transfer the steering control authority of the vehicle to the driver.

In step S520, if the apparatus for determining road environment determines that the driver of the vehicle wants to enter the ramp section based on the vehicle behavior obtained by the sensor (vehicle sensor), it may be controlled to execute the ramp section entry mode to ensure that the vehicle enters the ramp section smoothly by automatically controlling the vehicle's steering, braking, and/or acceleration apparatus.

In step S530, if it is determined that the vehicle has completely entered the ramp section, the apparatus for determining road environment may end the ramp section entry mode and control the vehicle to drive in the normal operation mode.

Figure 6:
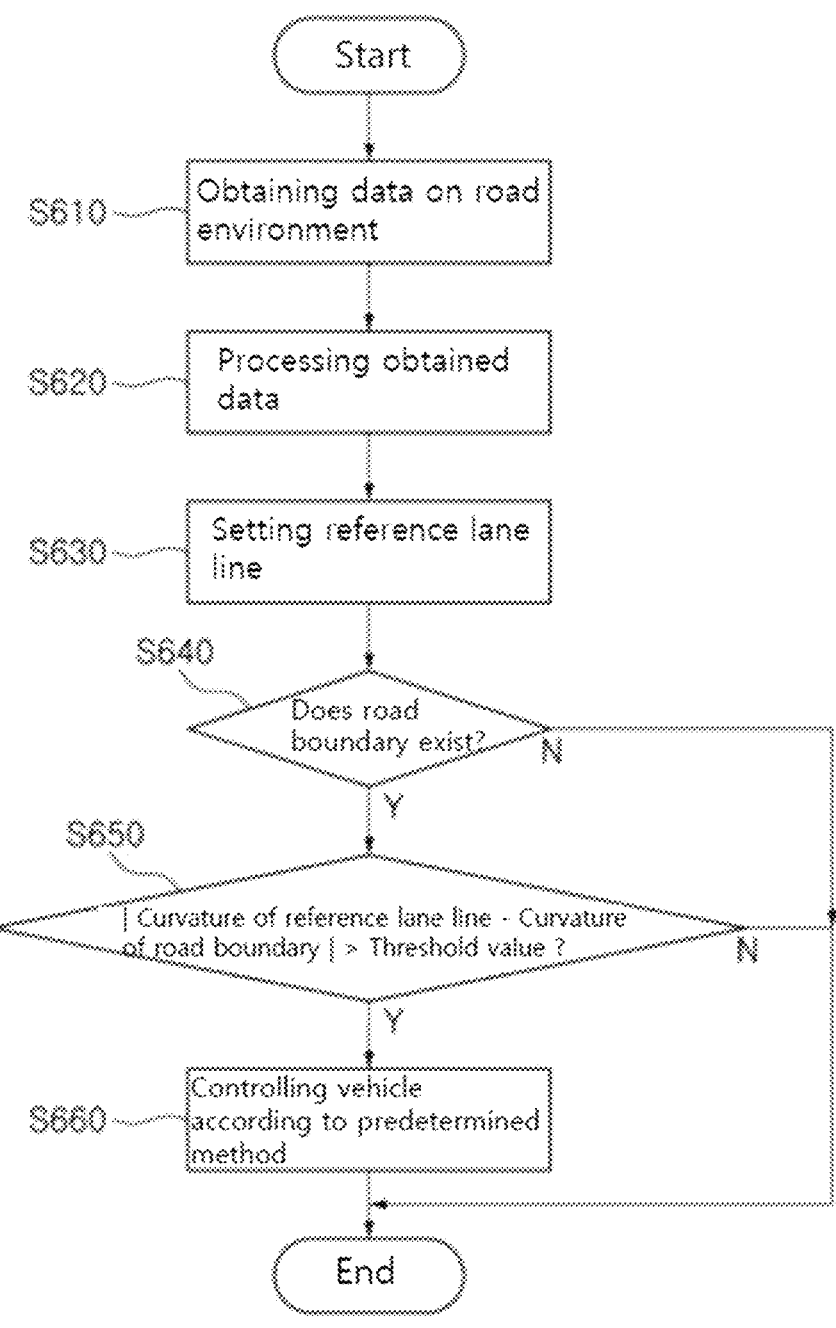
FIG. 6 is a flowchart showing an operation of the apparatus for determining road environment according to an embodiment of the present disclosure.

FIG. 6 is a flowchart showing an operation of the apparatus for determining road environment according to an embodiment of the present disclosure.

In step S610, the apparatus for determining road environment may collect data on the road environment based on the image captured by the camera. For example, the apparatus for determining road environment may collect data on driving lane information, adjacent lane information, and road boundary information.

In step S620, the apparatus for determining road environment may process the collected data and determine the reliability of each collected data. In one embodiment of the present disclosure, the apparatus for determining road environment may calculate the reliability score for the collected data based on the viewing range, the turning direction of the vehicle, the recognition clarity, the position of the vehicle, etc.

In step S630, the apparatus for determining road environment may set a reference lane line that serves as a standard for determining the road environment based on the reliability score calculated in step S620.

In step S640, the apparatus for determining road environment may determine whether the road boundary exists outside the reference lane line. At this time, if it is determined that the road boundary exists, the apparatus for determining road environment may determine whether the absolute value of the difference between the curvature of the reference lane line and the curvature of the road boundary is greater than the threshold value, and if it is determined to be greater than the threshold value, it may be determined that the ramp section exists ahead in the driving direction of the vehicle (S650).

If it is determined that the ramp section exists in front of the vehicle in the driving direction, the apparatus for determining road environment may control the vehicle according to a predetermined method in step S660. In an embodiment of the present disclosure, the apparatus for determining road environment may control the steering control authority of the driving vehicle to be transferred to the driver.

Although embodiments of the present disclosure have been described in detail with reference to the accompanying drawings, the present disclosure is not necessarily limited to these embodiments, and may be implemented in various modifications without departing from the technical spirit of the present disclosure. Accordingly, the embodiments disclosed in the present disclosure are not intended to limit the technical idea of the present disclosure, but are for illustrative purposes, and the scope of the technical idea of the present disclosure is not limited by these embodiments. Therefore, the embodiments described above should be understood in all respects as illustrative and not restrictive.

The scope of protection of the present disclosure should be interpreted in accordance with the claims below, and all technical ideas within the equivalent scope should be interpreted as being included in the scope of rights of the present disclosure.

EXPLANATION OF REFERENCE

10: Camera
20: Sensor
100: Controller
110: Processor
120: Memory
30: Steering apparatus
40: Braking apparatus
50: Acceleration apparatus

What is claimed is:

1. An apparatus for determining road environment, comprising:
   a data collector configured to obtain data on road environment information and data on vehicle behavior;
   a data processor configured to determine reliability of the obtained data;
   a data determiner configured to determine the road environment based on the reliability; and
   a vehicle controller configured to control a vehicle based on the determined road environment,
   wherein the data determiner is configured to:
      set a reference lane line having a higher reliability from a left lane line and a right lane line of a driving lane of the vehicle based on the determined reliability;
      determine whether a road boundary exists outside the set reference lane line; and
      in response to a determination that the road boundary exists, determine that a ramp section exists in front of the vehicle if an absolute value of a difference between a curvature of the reference lane line and a curvature of the road boundary is greater than a threshold value.

2. The apparatus of claim 1, wherein the data on road environment information comprises driving lane information, adjacent lane information, and road boundary information.

3. The apparatus of claim 1, wherein the data processor is configured to determine the reliability of the data based on a viewing range, a curvature, or a recognition clarity of the data.

4. The apparatus of claim 1, wherein the vehicle controller is configured to transfer a steering control authority of the vehicle to a driver in response to the determination that the ramp section exists in front of the vehicle.

5. The apparatus of claim 1, wherein the data processor is configured to assign a higher reliability score to a lane line in a direction opposite to a turning direction of the vehicle than a lane line in the turning direction.

6. The apparatus of claim 1, wherein the data collector is configured to obtain data from images captured by a camera.

7. The apparatus of claim 1, wherein the data determiner is further configured to determine whether a driver intends to enter the ramp section based on the data on the vehicle behavior.

8. The apparatus of claim 7, wherein the vehicle controller is configured to automatically control at least one of a steering apparatus, a braking apparatus, and an acceleration apparatus for the vehicle to enter the ramp section, in response to a determination that the driver intends to enter the ramp section.

9. A method for determining road environment, comprising:

obtaining data on road environment information and data on vehicle behavior;

determining reliability of the obtained data;

determining the road environment based on the reliability; and controlling a vehicle based on the determined road environment, wherein the determining of the road environment based on the reliability comprises:

setting a reference lane line having a higher reliability from a left lane line and a right lane line of a driving lane of the vehicle based on the determined reliability;

determining whether a road boundary exists outside the set reference lane line; and in response to a determination that the road boundary exists, determining that a ramp section exists in front of the vehicle if an absolute value of a difference between a curvature of the reference lane line and a curvature of the road boundary is greater than a threshold value.

10. The method of claim 9, wherein the data on road environment information comprises driving lane information, adjacent lane information, and road boundary information.

11. The method of claim 9, wherein the determining of the reliability of the obtained data comprises determining the reliability of the data based on a viewing range, a curvature, or a recognition clarity of the data.

12. The method of claim 9, further comprising:

transferring a steering control authority of the vehicle to a driver in response to the determination that the ramp section exists in front of the vehicle.

13. The method of claim 9, wherein the determining of the reliability of the obtained data comprises assigning a higher reliability score to a lane line in a direction opposite to a turning direction of the vehicle than a lane line in the turning direction.

14. The method of claim 9, wherein the data on the road environment information is obtained from images captured by a camera.

15. The method of claim 9, further comprising:

determining whether a driver intends to enter the ramp section based on the data on the vehicle behavior.

16. The method of claim 15, further comprising:

in response to a determination that the driver intends to enter the ramp section, executing a ramp section entry mode for the vehicle to enter the ramp section by automatically controlling at least one of a steering apparatus, a braking apparatus, and an acceleration apparatus.

17. The method of claim 16, further comprising:

determining whether the vehicle has completely entered the ramp section; and in response to a determination that the vehicle has completely entered the ramp section, terminating the ramp section entry mode and controlling the vehicle to drive in a normal operation mode.

18. An apparatus comprising at least one processor and a memory, wherein by executing program instructions loaded into the memory, the at least one processor is configured to: obtain data on road environment information and data on vehicle behavior; determine reliability of the obtained data; determine road environment based on the reliability; and control a vehicle based on the determined road environment, and wherein the at least one processor is further configured to:

set a reference lane line having a higher reliability from a left lane line and a right lane line of a driving lane of the vehicle based on the determined reliability; determine whether a road boundary exists outside the set reference lane line; and in response to a determination that the road boundary exists, determine that a ramp section exists in front of the vehicle if an absolute value of a difference between a curvature of the reference lane line and a curvature of the road boundary is greater than a threshold value.

\* \* \* \* \*